United States Patent
Collins et al.

(10) Patent No.: US 11,609,151 B1
(45) Date of Patent: Mar. 21, 2023

(54) MONITORING FULL EMISSIONS PROFILE OF A NATURAL GAS COMPRESSOR

(71) Applicant: Kodiak Gas Services, LLC, Montgomery, TX (US)

(72) Inventors: Craig Collins, Montgomery, TX (US); Jesus Elizondo, Montgomery, TX (US); Pedro Buhigas, Montgomery, TX (US)

(73) Assignee: Kodiak Gas Services, LLC, Montgomery, TX (US)

( * ) Notice: Subject to any disclaimer, the term of this patent is extended or adjusted under 35 U.S.C. 154(b) by 0 days.

(21) Appl. No.: 17/859,342

(22) Filed: Jul. 7, 2022

(51) Int. Cl.
*G01M 15/10* (2006.01)
*G01M 3/38* (2006.01)
*G07C 3/14* (2006.01)

(52) U.S. Cl.
CPC ............ *G01M 15/108* (2013.01); *G01M 3/38* (2013.01); *G07C 3/143* (2013.01)

(58) Field of Classification Search
CPC ........... G01N 33/0075; G01N 21/3504; G01N 33/0031; G01N 15/0205; G01N 33/0073; G01N 33/0022; G01M 3/007; G01M 15/108; G01M 3/38; G07C 5/006; G07C 5/0816; G07C 3/143; Y02P 90/84; G05B 19/4183
See application file for complete search history.

(56) References Cited

U.S. PATENT DOCUMENTS

| | | | | |
|---|---|---|---|---|
| 2019/0340914 A1* | 11/2019 | Israelsen | ................. | G01M 3/04 |
| 2021/0190747 A1* | 6/2021 | Cobley | ............. | G01N 33/0022 |
| 2022/0091026 A1* | 3/2022 | Scott | ........................ | G01P 13/02 |

* cited by examiner

*Primary Examiner* — Eric S. McCall
*Assistant Examiner* — Timothy P Graves
(74) *Attorney, Agent, or Firm* — Maier & Maier, PLLC

(57) ABSTRACT

An exemplary embodiment may include a control hub configured to receive data from an emissions analyzer and a leak detection camera. The emissions analyzer may detect levels of various gases and relay such information to the control hub. In an exemplary embodiment, the emissions analyzer may purge after every test to ensure longevity and accuracy. A leak detection camera may implement quantifying optical gas imaging in order to continuously monitor for fugitive leaks on a compressor package. If a leak is detected, it may be logged and the user or an operating group may be alerted.

7 Claims, 4 Drawing Sheets

MONITORING FULL EMISSIONS PROFILE OF A NATURAL GAS COMPRESSOR

FIELD

An exemplary embodiment relates to the field of engine monitoring and management.

BACKGROUND

Environmental policy frameworks have long been pushing for commitments to reduce greenhouse gas emissions. Engine exhaust gas is the largest source of greenhouse gas emissions on natural gas engine-driven compressor packages. The gases contributing the most to greenhouse gas emissions are CH4 and CO2 with NOx and CO contributing to pollution. Greenhouse gases come from two other major sources on a natural gas engine-driven compressor: intentional and unintentional discharges. For example, intentional discharges may include blowdowns and normal operations of pneumatic devices on the engine, compressor or skid. Unintentional discharges may include, for example, methane leaks from various components of the system. Due to increasing regulations and an increased need to reduce greenhouse gases, there is a need in the field to fully monitor emissions from such systems and provide options for reducing emissions.

SUMMARY

According to at least one exemplary embodiment, a method, system and apparatus for monitoring natural gas compressors may be shown and described. An exemplary embodiment may include a control hub configured to receive data from an emissions analyzer and a leak detection camera. The emissions analyzer may detect levels of various gases and relay such information to the control hub. In an exemplary embodiment, the emissions analyzer may purge after every test to ensure longevity and accuracy. A leak detection camera may implement quantifying optical gas imaging in order to continuously monitor for fugitive leaks on a compressor package. If a leak is detected, it may be logged and the user or an operating group may be alerted.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Figure 1:
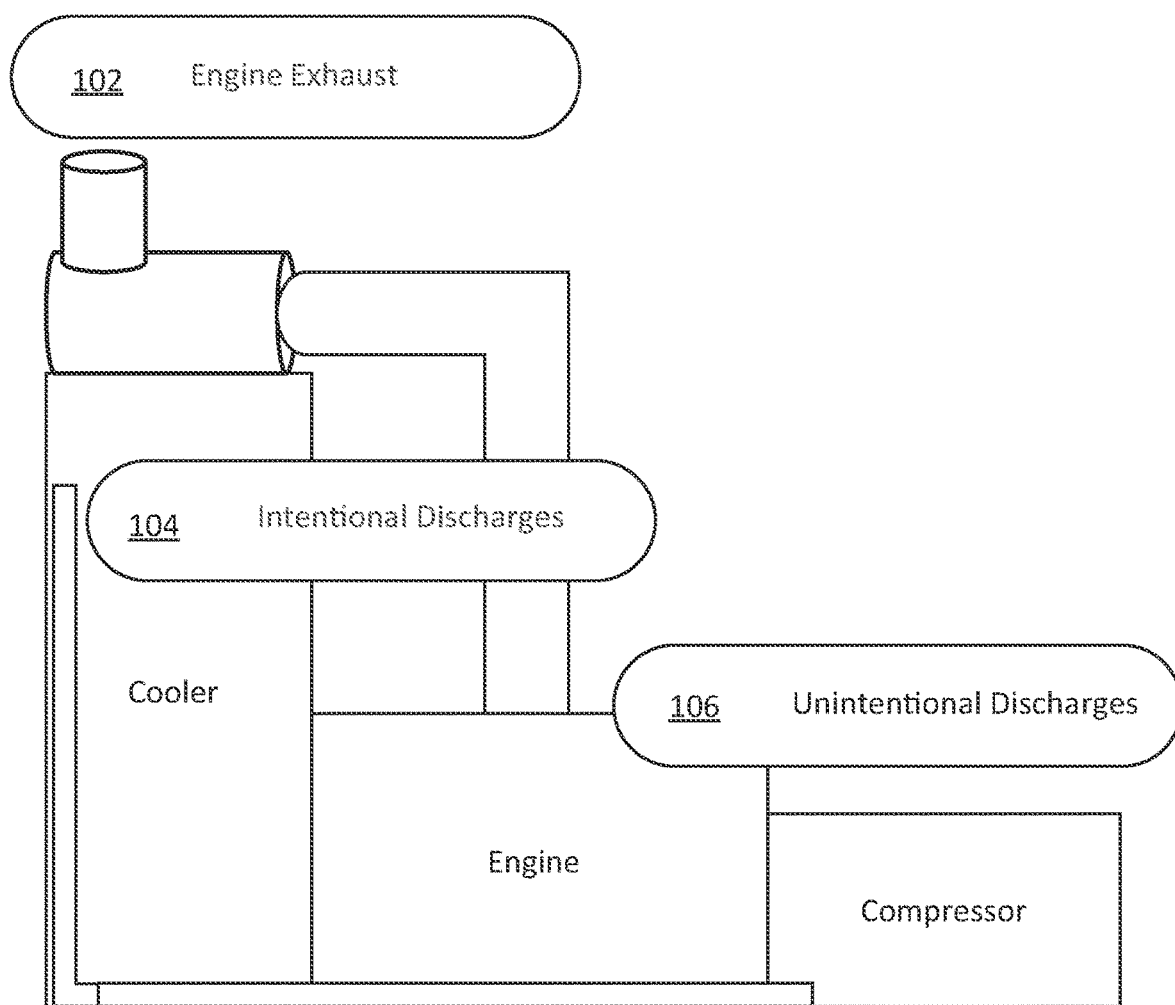
FIG. 1 is an exemplary embodiment of a compressor package.

A system for monitoring emissions may be provided. The emissions of an entire site or of one or more natural gas compressors may be monitored. FIG. 1 may illustrate an exemplary compressor package. As illustrated in FIG. 1, the compressor may be connected to an engine and a cooler. The engine exhaust 102 may be produce greenhouse gases, as expected .An exemplary embodiment may monitor engine exhaust 102 as well as intentional 104 and unintentional discharges 106. For example, engine exhaust gasses may be monitored using an emissions analyzer. The emissions analyzer may include multiple sensors configured to detect the levels of various gasses which may pass through the engine exhaust. The emissions analyzer may detect emissions using both electromechanical gas sensors and infrared sensors.

Figure 2:
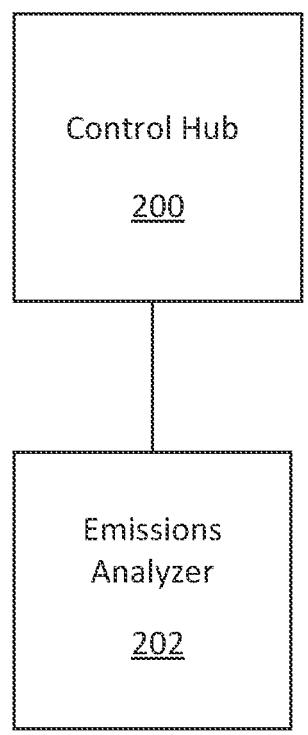
FIG. 2 is an exemplary embodiment of a control hub and emissions analyzer.

Referring now to the exemplary embodiment in FIG. 2, FIG. 2 may illustrate a control hub 200 and an emissions analyzer 202. The levels of the gasses may be detected by the emissions analyzer 202 and then sent and/or stored in or by a central control hub 200. The central control hub 200 may be an Internet of Things (IoT) hub that can receive hundreds of data points every second from various devices and sensors, including the emissions analyzer 202 and the engine control module (ECM) of the natural gas compressor. Engine performance data may be taken from the ECM. This data may be stored locally on the IoT device and then transmitted to a cloud-based database. The control hub 200 may store the data, such as the sensor data, along with various contextual information such as relevant or concurrent errors from the ECM or other information.

An exemplary embodiment may connect to an engine's control module or unit. The ECM/ECU may provide information regarding faults detected in the engine's own sensor system. For example, a higher or lower temperature in an engine pressure sensor may create a fault within the ECM. An exemplary control hub may communicate with the ECM to receive all faults therefrom. Thus, the control hub may identify the higher or lower temperature in the specified sensor and may correlate that fault with other data captured from the engine, cameras, or sensors. An exemplary embodiment may, for example, identify that there is a leak originating from a specific component based on optical image data illustrating a leak from that component coupled with a fault from the ECM indicating an error from that or a related component. An exemplary embodiment may implement machine learning and/or artificial intelligence in order to identify potential sources of faults or leaks.

Figure 3:
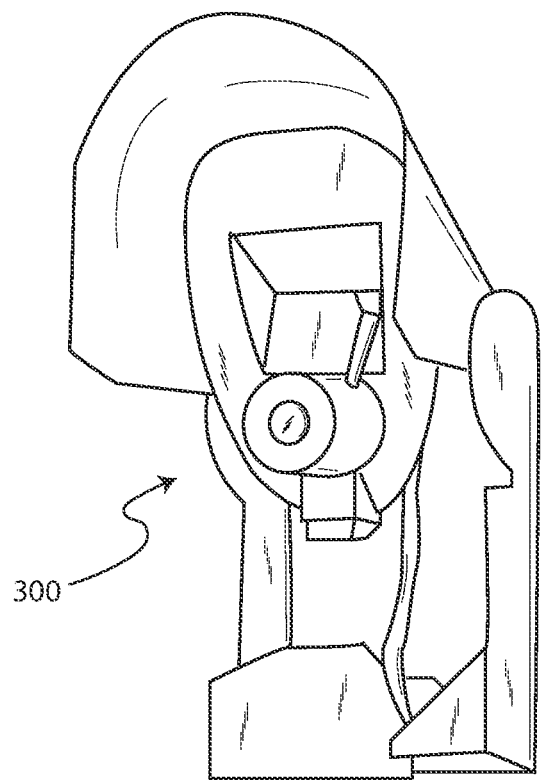
FIG. 3 is an exemplary embodiment of a leak detection camera.

Referring now to FIG. 3, an exemplary embodiment may further include one or more leak detection cameras. Using quantifying optical gas imaging, a camera may be placed to continuously monitor for fugitive leaks on a compressor package. Upon detecting a leak, a log may be created and/or an alert may be sent to a user or operating group to remedy the leak. The leak detection cameras may be installed on a pole, trailer, or on top of another element of an exemplary embodiment. The cameras may be placed such that a view of the entire skid (e.g., compressor, engine, etc.) is visible. The images and videos from the cameras may be stored locally on the IoT device and then pushed to, for example, a cloud-based database. The images and videos are cross-referenced with the ECM and compressor data to analyze the source and reason for a leak.

Figure 4A:
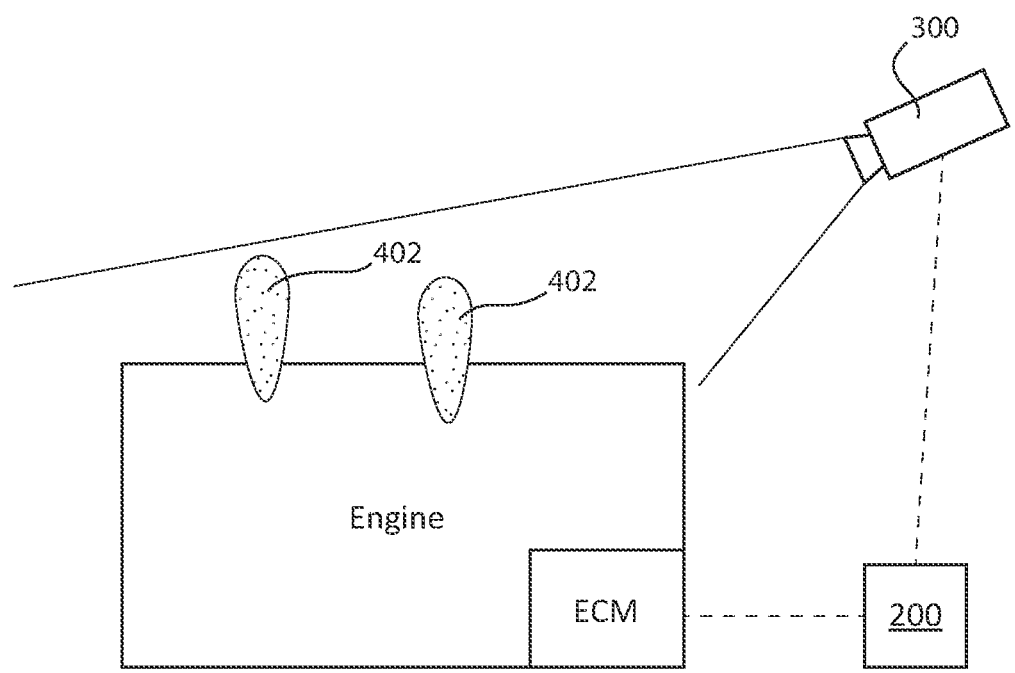
FIG. 4A is an exemplary leak detection image.
Figure 4B:
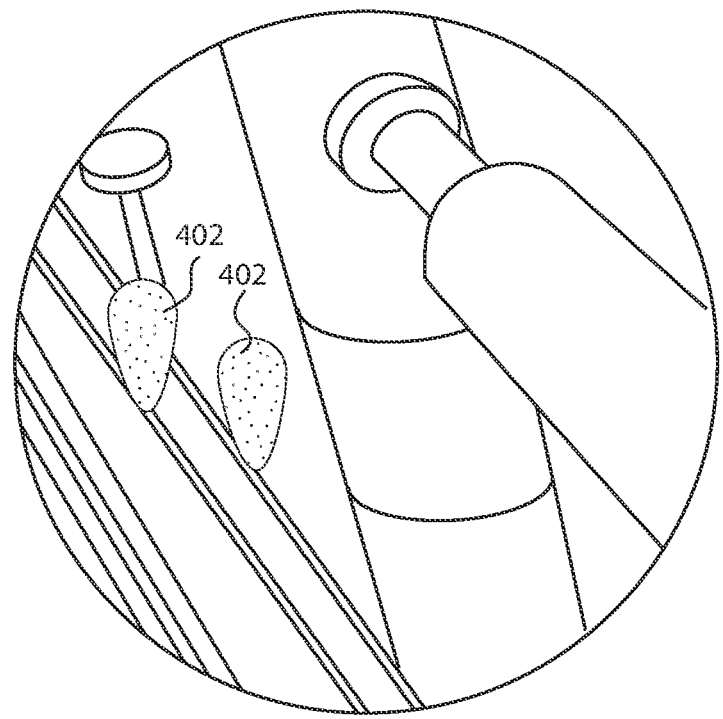
FIG. 4B is an exemplary leak detection image.

As illustrated in exemplary FIGS. 4A and 4B, a log or notification of a leak may include an identification of the location of the leak 402. The location of the leak may be identified based on the location of the detected gas as observed from a leak detection camera 300 or based on information received from the emissions analyzer 202. By tracking the location of a leak, an exemplary embodiment may be better equipped to respond to leaks and can further assist an operator in maintenance. As a result, maintenance and repairs may be performed quicker, since an exemplary embodiment can highlight sources of a leak, including potentially faulty parts or components, and then can recommend solutions such as a replacement part, gasket, or component.

In an exemplary embodiment, a control hub, emissions analyzer, and/or leak detection camera may be connected to an existing compressor package, or an exemplary embodiment may include a compressor package with a control hub, emissions analyzer, and/or leak detection camera already installed or connected. An exemplary embodiment may continuously monitor the compressor or engine in real time, thus increasing the accuracy of emissions calculations while providing opportunities for reducing emissions by detecting and/or preventing leaks.

An exemplary embodiment may include machine learning to make recommendations on changes to the operating parameters of the equipment, predict mechanical failures, and identify parts for replacement before failure. For example, the BTU/timing settings on an engine may be adjusted by an exemplary embodiment to allow for optimal performance and reduction of CH4 and CO2 by optimizing the emissions output.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for monitoring emissions of a natural gas compressor, comprising:
   detecting, using sensor data, levels of a plurality of gasses using a plurality of sensors and relaying the sensor data to a control hub;
   associating operating data received from an engine control module (ECM) connected to the natural gas compressor with the sensor data;
   storing the sensor data along with the operating data pertaining to the natural gas compressor;
   identifying a leaking component of the natural gas compressor based on the sensor data and the operating data;
   providing a recommended action related to the leaking component; and
   calculating an emissions output of the natural gas compressor based on the sensor data.

2. The method for monitoring emissions of a natural gas compressor of claim 1, further comprising continuously capturing a plurality of images using optical gas imaging, detecting a leak location and cause based on one or more of the plurality of images.

3. The method for monitoring emissions of a natural gas compressor of claim 2, further comprising emphasizing the leak location and cause in one of the plurality of images and presenting the image with the emphasized leak location to a user.

4. The method for monitoring emissions of a natural gas compressor of claim 1, wherein the recommended action includes at least one of recommending a replacement component identical to the leaking component, and/or a price and/or and recommending a vendor of the replacement component.

5. The method for monitoring emissions of a natural gas compressor of claim 2, further comprising recommending maintenance to one or more components of the natural gas compressor based on the sensor data and/or the plurality of images.

6. The method for monitoring emissions of a natural gas compressor of claim 2, further comprising presenting a report.

7. A system for monitoring and analyzing a natural gas compressor, comprising:
   an emissions analyzer comprising one or more sensors configured to detect a level of each of a plurality of gasses and relay the levels to a control hub;
   a leak detection camera implementing optical gas imaging configured to continuously monitor the natural gas compressor, and upon detecting a leak, create a log and/or an alert; and
   the control hub configured to receive and store emissions analyzer sensor data, leak detection camera images and operating data from a natural gas compressor ECM,
   wherein the control hub is configured to cross-reference the emission analyzer sensor data with the operating data from the ECM and leak detection camera images to detect a leak source and provide a recommended action.

* * * * *